US012670652B2

(12) United States Patent
Xu et al.

(10) Patent No.: US 12,670,652 B2
(45) Date of Patent: *Jun. 30, 2026

(54) LEARNING 2D TEXTURE MAPPING IN VOLUMETRIC NEURAL RENDERING

(71) Applicant: Adobe Inc., San Jose, CA (US)

(72) Inventors: Zexiang Xu, San Jose, CA (US);
Yannick Hold-Geoffroy, San Jose, CA
(US); Milos Hasan, Lafayette, CA
(US); Kalyan Sunkavalli, San Jose, CA
(US); Fanbo Xiang, San Diego, CA
(US)

(73) Assignee: Adobe Inc., San Jose, CA (US)

( * ) Notice: Subject to any disclaimer, the term of this
patent is extended or adjusted under 35
U.S.C. 154(b) by 168 days.

This patent is subject to a terminal dis-
claimer.

(21) Appl. No.: 18/426,084

(22) Filed: Jan. 29, 2024

(65) Prior Publication Data

US 2024/0177399 A1 May 30, 2024

Related U.S. Application Data

(63) Continuation of application No. 17/559,867, filed on
Dec. 22, 2021, now Pat. No. 11,887,241.

(60) Provisional application No. 63/130,319, filed on Dec.
23, 2020.

(51) Int. Cl.
| | |
|---|---|
| *G06T 15/04* | (2011.01) |
| *G06N 3/045* | (2023.01) |
| *G06N 3/08* | (2023.01) |
| *G06T 15/20* | (2011.01) |
| *G06T 19/20* | (2011.01) |

(52) U.S. Cl.
CPC ............. *G06T 15/04* (2013.01); *G06N 3/045*
(2023.01); *G06N 3/08* (2013.01); *G06T 15/20*
(2013.01); *G06T 19/20* (2013.01)

(58) Field of Classification Search
CPC ......... G06T 15/04; G06T 15/20; G06T 19/20;
G06N 3/045; G06N 3/08
See application file for complete search history.

(56) References Cited

U.S. PATENT DOCUMENTS

| | | | | |
|---|---|---|---|---|
| 11,272,164 | B1 * | 3/2022 | Xing | ....................... G06F 9/445 |
| 2019/0304069 | A1 * | 10/2019 | Vogels | ................... G06N 3/096 |
| 2020/0082595 | A1 * | 3/2020 | Okada | ................... G06T 15/506 |

(Continued)

OTHER PUBLICATIONS

Chen, Wenzheng, et al. "Learning to predict 3d objects with an
interpolation-based differentiable renderer." Advances in neural
information processing systems 32 (2019). (Year: 2019).*

(Continued)

*Primary Examiner* — Xin Sheng
(74) *Attorney, Agent, or Firm* — Nicholson De Vos
Webster & Elliott LLP

(57) ABSTRACT

Embodiments are disclosed for neural texture mapping. In
some embodiments, a method of neural texture mapping
includes obtaining a plurality of images of an object, deter-
mining volumetric representation of a scene of the object
using a first neural network, mapping 3D points of the scene
to a 2D texture space using a second neural network, and
determining radiance values for each 2D point in the 2D
texture space from a plurality of viewpoints using a second
neural network to generate a 3D appearance representation
of the object.

20 Claims, 11 Drawing Sheets

(56) References Cited

U.S. PATENT DOCUMENTS

2022/0051485 A1 * 2/2022 Martin Brualla ....... G06T 15/04

OTHER PUBLICATIONS

Bi, S. et al., "Deep Reflectance vols. Relightable Reconstructions from Multi-View Photometric Images," arXiv:2007.09892 [cs.CV], Jul. 2020, pp. 1-21.
Bi, S. et al., "Neural Reflectance Fields for Appearance Acquisition," arXiv:2008.03824 [cs.CV], Aug. 2020, pp. 1-11.
Groueix, T. et al., "A Papier-Mach'e Approach to Learning 3D Surface Generation," 2018 IEEE/CVF Conference on Computer Vision and Pattern Recognition (CVPR), Jun. 2018, pp. 216-224.
Lombardi, S. et al., "Neural Volumes: Learning Dynamic Renderable Volumes from Images," arXiv: 1906.07751 [cs.GR], Jun. 2019, pp. 1-14.
Mildenhall, B. et al., "NeRF: Representing Scenes as Neural Radiance Fields for View Synthesis," arXiv:2003.08934v2, Aug. 3, 2020, 25 pages.
Non-Final Office Action, U.S. Appl. No. 17/559,867, May 11, 2023, 27 pages.
Notice of Allowance, U.S. Appl. No. 17/559,867, Sep. 20, 2023, 8 pages.

* cited by examiner

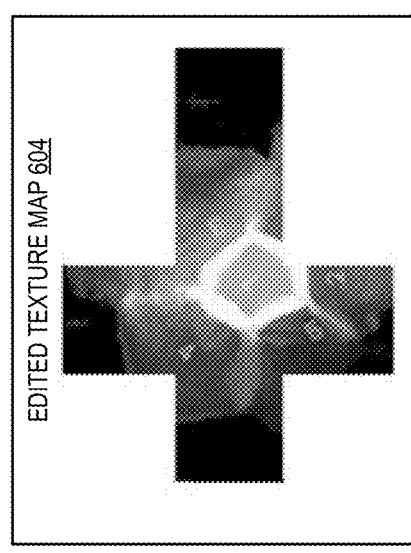
EDITED TEXTURE MAP 604
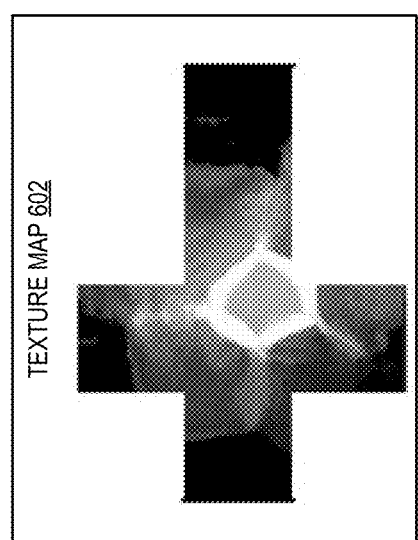
TEXTURE MAP 602
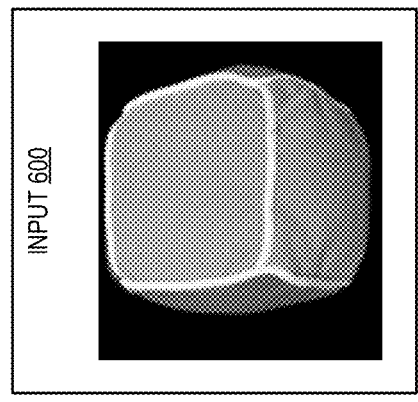
INPUT 600
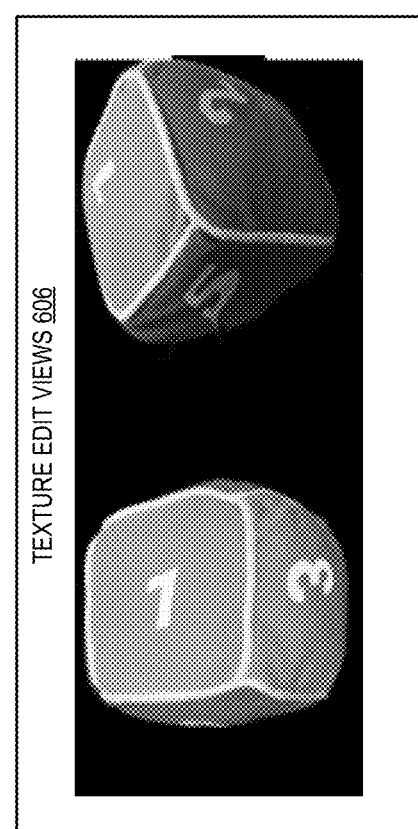
TEXTURE EDIT VIEWS 606
*FIG. 6*

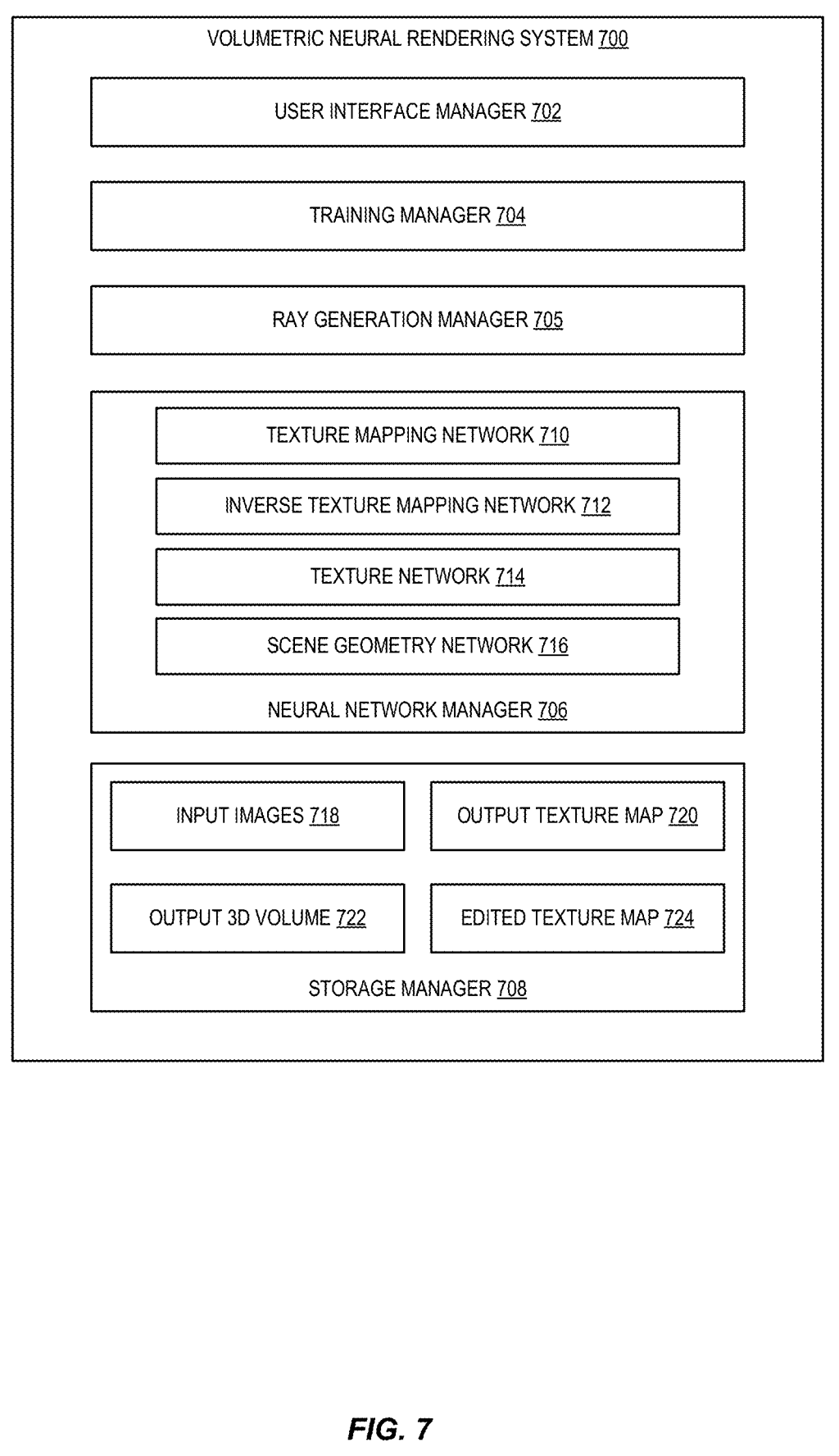

VOLUMETRIC NEURAL RENDERING SYSTEM 700

USER INTERFACE MANAGER 702

TRAINING MANAGER 704

RAY GENERATION MANAGER 705

TEXTURE MAPPING NETWORK 710

INVERSE TEXTURE MAPPING NETWORK 712

TEXTURE NETWORK 714

SCENE GEOMETRY NETWORK 716

NEURAL NETWORK MANAGER 706

INPUT IMAGES 718

OUTPUT TEXTURE MAP 720

OUTPUT 3D VOLUME 722

EDITED TEXTURE MAP 724

STORAGE MANAGER 708

*FIG. 7*

800

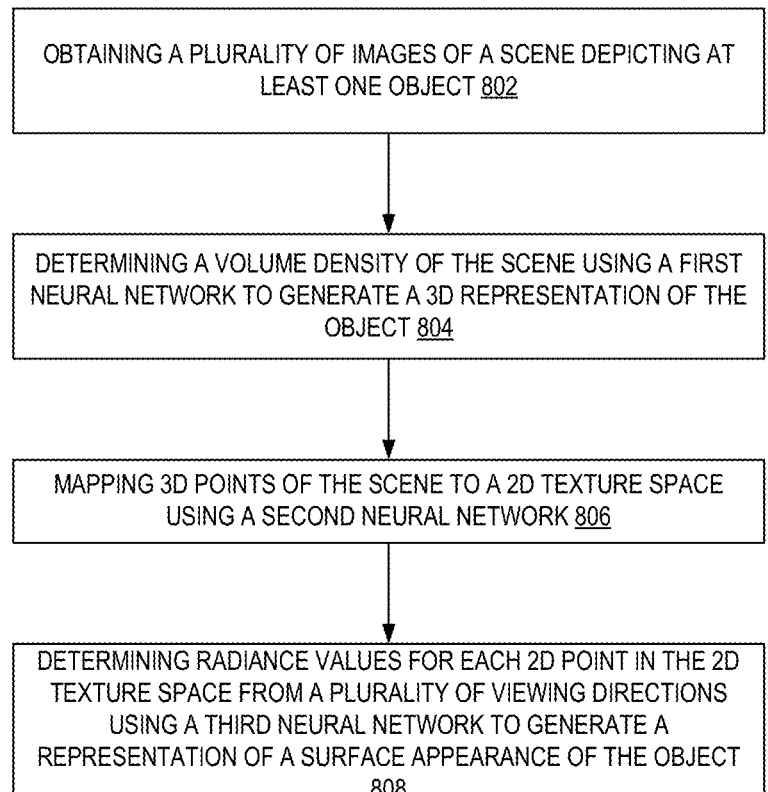

OBTAINING A PLURALITY OF IMAGES OF A SCENE DEPICTING AT LEAST ONE OBJECT 802

DETERMINING A VOLUME DENSITY OF THE SCENE USING A FIRST NEURAL NETWORK TO GENERATE A 3D REPRESENTATION OF THE OBJECT 804

MAPPING 3D POINTS OF THE SCENE TO A 2D TEXTURE SPACE USING A SECOND NEURAL NETWORK 806

DETERMINING RADIANCE VALUES FOR EACH 2D POINT IN THE 2D TEXTURE SPACE FROM A PLURALITY OF VIEWING DIRECTIONS USING A THIRD NEURAL NETWORK TO GENERATE A REPRESENTATION OF A SURFACE APPEARANCE OF THE OBJECT 808

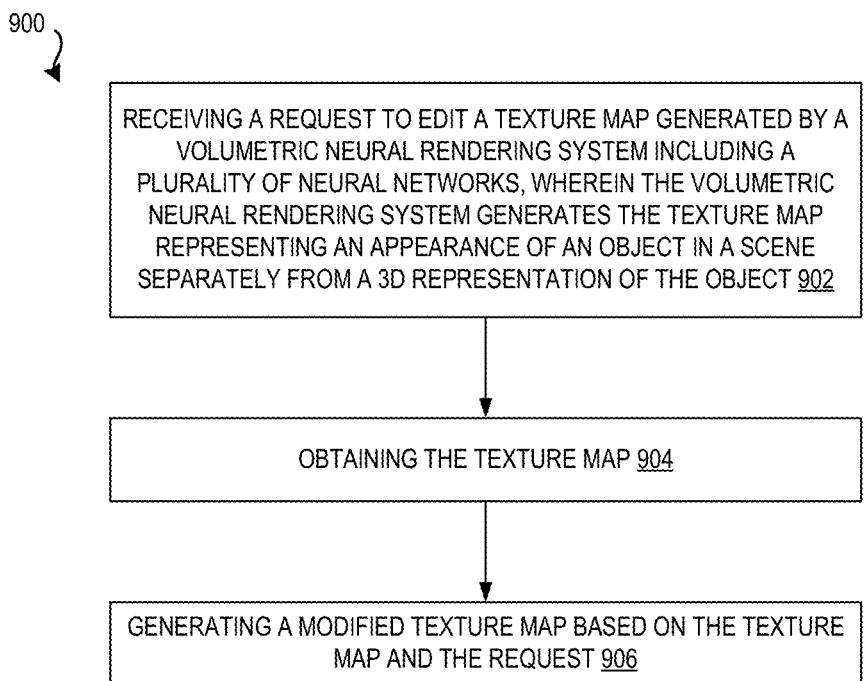

RECEIVING A REQUEST TO EDIT A TEXTURE MAP GENERATED BY A VOLUMETRIC NEURAL RENDERING SYSTEM INCLUDING A PLURALITY OF NEURAL NETWORKS, WHEREIN THE VOLUMETRIC NEURAL RENDERING SYSTEM GENERATES THE TEXTURE MAP REPRESENTING AN APPEARANCE OF AN OBJECT IN A SCENE SEPARATELY FROM A 3D REPRESENTATION OF THE OBJECT 902

OBTAINING THE TEXTURE MAP 904

GENERATING A MODIFIED TEXTURE MAP BASED ON THE TEXTURE MAP AND THE REQUEST 906

*FIG. 9*

LEARNING 2D TEXTURE MAPPING IN VOLUMETRIC NEURAL RENDERING

CROSS-REFERENCE TO RELATED APPLICATIONS

This application is a continuation of U.S. patent application Ser. No. 17/559,867, filed on Dec. 22, 2021, which application claims the benefit of U.S. provisional application no. 63/130,319, filed on Dec. 23, 2020, which applications are incorporated by reference herein in their entirety. The Applicant hereby rescinds any disclaimer of claim scope in the parent application and the prosecution history thereof and advises the Patent Office that a claim presented in this application may be broader in at last some respects than those presented in the parent application.

BACKGROUND

Capturing and modeling real scenes from image inputs is an extensively studied problem in vision and graphics. One crucial goal of this task is to avoid the tedious manual 3D modeling process and directly provide a renderable and editable 3D model that can be used for realistic rendering in applications, like e-commerce, VR and AR. Traditional 3D reconstruction methods usually reconstruct objects as meshes. Meshes are widely used in rendering pipelines; they are typically combined with mapped textures for appearance editing in 3D modeling pipelines.

However, mesh-based reconstruction is particularly challenging and often cannot synthesize highly realistic images for complex objects. Recently, various neural scene representations have been presented to address this scene acquisition task. Arguably the best visual quality is obtained by approaches like NeRF and Deep Reflectance Volumes that leverage differentiable volume rendering (e.g., ray marching). However, these volume-based methods entangle both geometry and appearance in a black box volume-encoding neural network. This does not allow for easy editing—as is possible with a texture mapped mesh—and significantly limits the practicality of these neural rendering approaches.

SUMMARY

Introduced here are techniques/technologies that uses multiple neural networks to perform volumetric neural rendering that disentangles geometry from appearance. The volumetric neural rendering system generates a continuous 3D model, representing an object's geometry, and a continuous 2D texture map, representing the object's appearance. This allows for the appearance of the object to be readily edited using conventional techniques directly on the 2D texture map.

More specifically, in one or more embodiments, the volumetric neural rendering system includes a plurality of sub-networks, including a 3D-to-2D texture mapping network, an inverse (e.g., 2D-to-3D) texture mapping network, a texture network, and a scene geometry network. The 3D-to-2D texture mapping network is constrained by the 2D-to-3D inverse mapping network and trained using a cycle consistency loss such that the 3D-to-2D texture mapping network learns to make 3D surface points map to 2D texture points that map back to the original 3D points. This prevents the 3D-to-2D mapping from becoming degenerate and not providing consistent coverage.

By separating geometry and appearance, embodiments allow users to edit the appearance of the object by simply editing the continuous 2D texture map. When a novel view is then synthesized, the resulting view includes the appearance provided by the modified texture map.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 6 illustrates an example of neural texture editing in accordance with one or more embodiments;

FIG. 7 illustrates a schematic diagram of a volumetric neural rendering system in accordance with one or more embodiments;

FIG. 8 illustrates a flowchart of a series of acts in a method of neural volumetric rendering in accordance with one or more embodiments;

FIG. 9 illustrates a flowchart of a series of acts in a method of neural texture editing in accordance with one or more embodiments;

DETAILED DESCRIPTION

One or more embodiments of the present disclosure include techniques for volumetric neural rendering that disentangles geometry—represented as a continuous 3D volume—from appearance—represented as a continuous 2D texture map. Embodiments achieve this by introducing a 3D-to-2D texture mapping (or surface parameterization) network into volumetric representations. This texture mapping network is constrained using an additional 2D-to-3D inverse mapping network and a novel cycle consistency loss to make 3D surface points map to 2D texture points that map back to the original 3D points. By separating geometry and texture, embodiments allow users to edit appearance by simply editing 2D texture maps.

Traditionally there have been two broad categories of techniques to perform object capture (e.g., to capture a real object and digitize it such that it can be rendered in a modeling tool, AR/VR environment, etc.). The conventional techniques include multiview stereo or photogrammetry, where a large number of photographs are taken of an object and used to reconstruct the geometry using a mesh. The texture can be reconstructed with texture mapping. These techniques are very challenging and can easily fail for challenging shapes with detailed geometry. Newer techniques have utilized neural networks, rather than meshes, to perform object capture. For example, a neural network can be used to encode the geometry and appearance of an object and can be used to render the object in an environment. However, these neural network-based techniques present a black box function. They can be used to render a realistic 3D version of a given object, but do not allow the appearance of that object to be edited.

Figure 1:
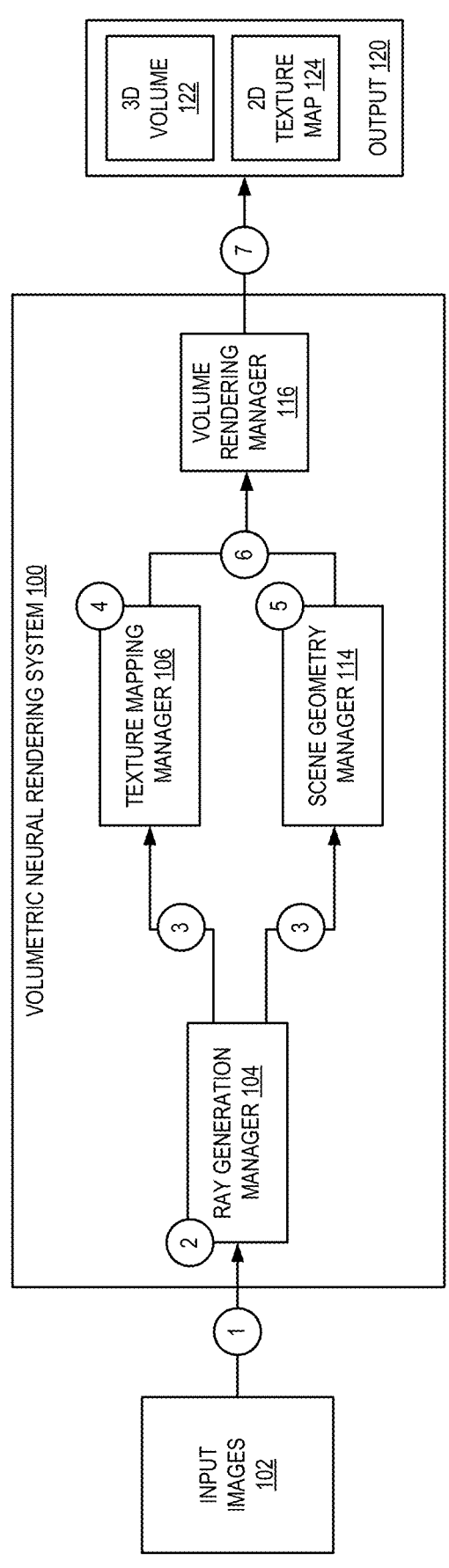
FIG. 1 illustrates a diagram of an architecture for neural volumetric rendering in accordance with one or more embodiments.

Embodiments improve on prior techniques by making the appearance of the captured object editable. For example, embodiments train a neural network to discover the surface so that it can be edited. The 3D surface of an object is mapped to a 2D texture space using a neural network. Once in the texture space, there is a 1-to-1 mapping from 2D to 3D. As such, any editing within the 2D space can then be mapped back into 3D space, allowing the appearance of the captured object to be edited FIG. 1 illustrates a diagram of an architecture for neural volumetric rendering in accordance with one or more embodiments. As discussed, volumetric neural rendering system 100 uses a plurality of machine learning models to generate a volumetric representation of an object represented in a plurality of input images, where the volumetric representation is disentangled from the appearance of the object, which is represented using 2D texture maps. This allows for differentiable volume rendering to reconstruct the scene from multi-view images, while allowing for conventional texture-editing techniques to be used to modify the appearance of the object. As such, once the networks are trained, given an arbitrary viewpoint, a photorealistic novel view of the scene can be generated, and the appearance edited by the user.

Volumetric neural rendering system 100 may be implemented as a standalone application or as part of another application or suite of applications. For example, in some embodiments, volumetric neural rendering system 100 is implemented as part of a graphic design application, enabling the scene geometry and appearance to be obtained and then edited by the user in the graphic design application. Alternatively, once the 2D texture map representing the scene appearance is generated by volumetric neural rendering system 100, it can be provided to a graphic design application for editing by the user.

As shown in FIG. 1, a volumetric neural rendering system 100 receives input images 102, at numeral 1. As discussed further below, the volumetric neural rendering system 100 is trained for a particular scene using a plurality of input images of the scene. For example, the input images may include tens to hundreds of images of the scene. The scene may include an object or objects which are represented in the input images. For example, the input images may include a representation of the object(s) captured various angles (e.g., different camera poses). The images can be captured using an image capture device, such as an image or video camera (e.g., a standalone camera or a camera integrated into another device, such as a mobile device, drone or other unmanned aerial vehicle, or other device).

At numeral 2, ray generation manager 104 implements ray marching techniques to generate a ray that is marched through each pixel, and sample the ray at a plurality of 3D shading points. At numeral 3, the sampled points and viewpoint are provided to a plurality of neural networks to regress volume density and radiance. Unlike prior techniques, such as neural radiance fields (NeRF), which use a single MLP to regress both density and radiance in a 3D volume, embodiments use multiple neural networks to separately represent the scene geometry and appearance. As discussed, this includes training a texture mapping neural network to regress a 2D UV coordinate at every 3D point in the scene, and use another neural network to regress radiance in the 2D texture space for any UV location. Thus, given any 3D shading point in ray marching, embodiments can obtain its radiance by sampling the reconstructed neural texture at its mapped UV location.

For example, texture mapping manager 106 includes a plurality of neural networks to generate radiance values (e.g., RGB values) based on a 3D point and direction, at numeral 4. As discussed further below, this may include neural networks to map the 3D point to a 2D UV coordinate in a texture space which is then used to regress the radiance values. Additionally, at numeral 5, scene geometry manager includes a neural network which models the scene geometry by regressing the volume density given a 3D point.

In various embodiments, the neural networks described herein may be implemented as multilayer perceptrons (MLPs), convolutional neural networks (CNNs), or other neural networks. Alternatively, some neural networks may be implemented as MLPs while others are implemented as CNNs or other combination or neural networks. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

The resulting radiance and volume density values output by the texture mapping manager 106 and scene geometry manager 114, respectively, are then provided to volume rendering manager 116, at numeral 6. Volume rendering manager 116 can implement conventional volume rendering techniques generate output 120 at numeral 7. This includes generating the 3D volume 122 at the appropriate view based on the volume density values and accumulating the per-point radiance values to compute the final pixel color which is embodied in 2D texture map 124. Volume rendering manager 116 then generates outputs the output image 120 Because the appearance (e.g., the 2D texture map 124) is generated separately as a texture, conventional texture editing techniques can be used to easily change the appearance of the object.

Embodiments can be incorporated into different volume rendering frameworks. For example, in addition to NeRF, embodiments can be combined with Neural Reflectance Fields to reconstruct BRDF parameters as 2D texture maps, enabling both view synthesis and relighting.

Additionally, embodiments are able to recover a meaningful surface-aware texture parameterization of a scene and enable appearance editing applications. This provides an important step towards making neural rendering methods useful in 3D design workflows.

Figure 2:
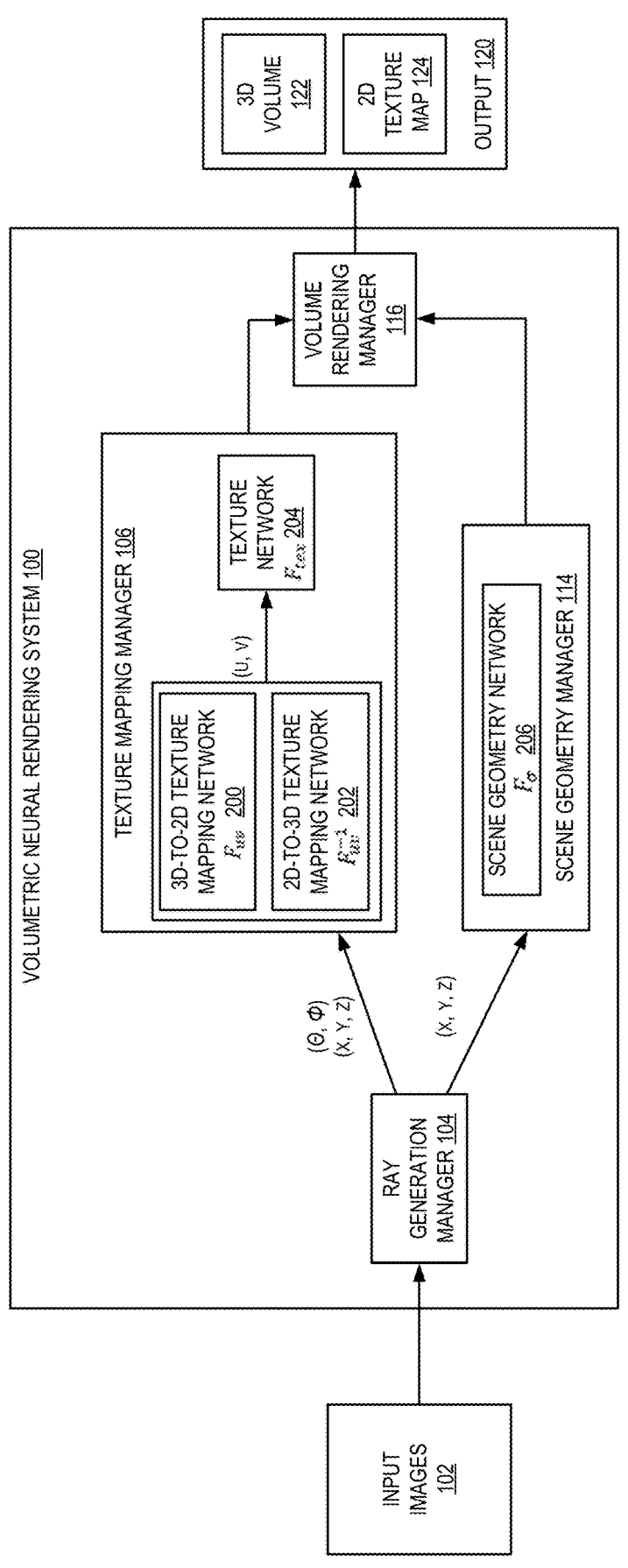
FIG. 2 illustrates a diagram of an architecture for neural volumetric rendering in accordance with one or more embodiments.

FIG. 2 illustrates a diagram of an architecture for neural volumetric rendering in accordance with one or more embodiments. As discussed, embodiments use multiple neural networks to regress the scene geometry and appearance for a given view of a scene. As shown in FIG. 2, embodiments use a 3D-to-2D texture mapping network ($F_{uv}$) 200 and an inverse 2D-to3D texture mapping network $$(F_{uv}^{-1})$$

202, a texture network ($F_{tex}$) 204, and a scene geometry network ($F_\sigma$) 206. This combination of networks enables the scene geometry to be disentangled from the scene appearance, allowing for intuitive appearance editing in the texture space.

While previous techniques utilized a single neural network for both geometry and appearance, merely adding a texture mapping network to the architecture of a prior technique does not yield useful results. For example, in such instances, the texture mapping network tends to learn to map multiple 3D points to the same 2D points, resulting in a degenerate texture mapping that does not unwrap the surface and cannot support texture editing. To ensure that the estimated texture space reasonably represents the object's 2D surface, embodiments use a pair of mapping networks: 3D-to-2D texture mapping network 200 and 2D-to-3D texture mapping network 204. A cycle consistency loss is used during training to ensure a consistent mapping between 3D points and 2D texture coordinates. By requiring the networks to learn to map 3D-to-2D and then also remap 2D-to-3D, the networks are prevented from mapping multiple 3D points to the same 2D point.

In some embodiments, the shading points that contribute predominantly to the pixel color along a given ray are considered to correspond to the points either on or close to the surface. The inverse 2D-to3D texture mapping network $$(F_{uv}^{-1})$$

202 is trained to map the 2D UV coordinates of these high-contribution points back to their 3D locations. Introducing this inverse-mapping network forces the volumetric neural rendering system 100 to learn a consistent mapping (e.g., similar to a one-to-one correspondence) between the 2D UV coordinates and the 3D points on the object surface. This additionally regularizes the surface reasoning and texture space discovery process. Accordingly, the volumetric neural rendering system 100 recovers a reasonable texture space, that can support realistic rendering while also allowing for intuitive appearance editing.

Figure 3:
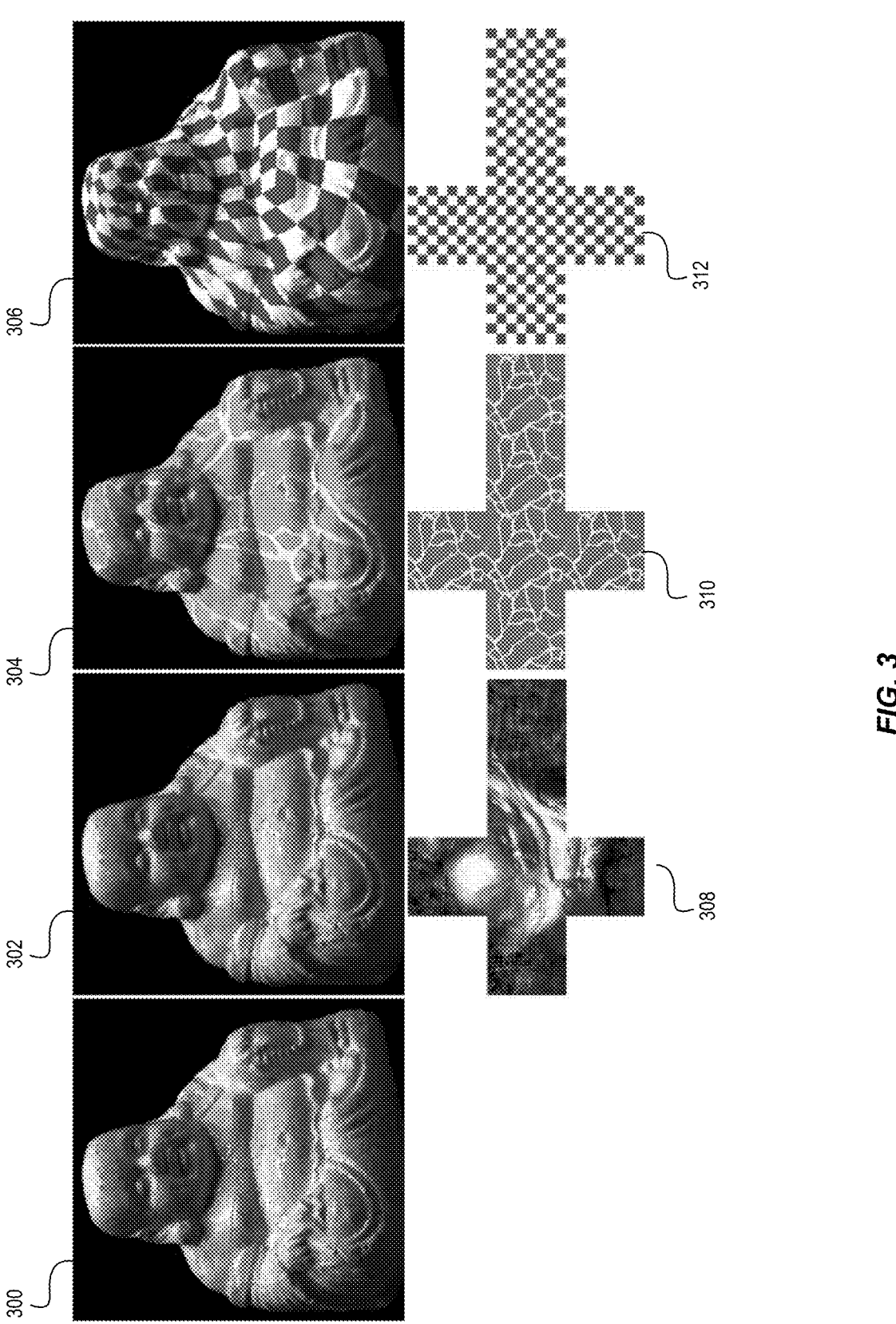
FIG. 3 illustrates an example of a disentangled neural scene representation in accordance with one or more embodiments.

FIG. 3 illustrates an example of a disentangled neural scene representation in accordance with one or more embodiments. FIG. 3 shows a ground truth image 300 and a plurality of synthetic images 302-306 generated using the above-described volumetric neural rendering system 100. As discussed, embodiments provide a neural scene representation that represents geometry as a 3D volume and appearance as a 2D neural texture in an automatically discovered texture space, as shown in texture maps 308-312.

As shown, synthetic image 302 closely resembles the ground truth image 300, providing a highly realistic synthetic image However, unlike prior techniques, the volumetric neural rendering system 100 additionally provides a 2D texture map 308 that captures the appearance of the object. The 2D texture map can be edited separately from the 3D model, allowing for the appearance of the object to be edited easily, using conventional texture editing techniques. For example, as shown in image 304, a new texture map 310 can be used to modify the appearance of the object. For example, texture map 310 can be combined with texture map 308 to yield image 304. Additionally, texture map 312 and corresponding image 306 illustrate the uniformity of the coverage provided by the texture map by rendering the object using a uniform checkboard texture.

Figure 4:
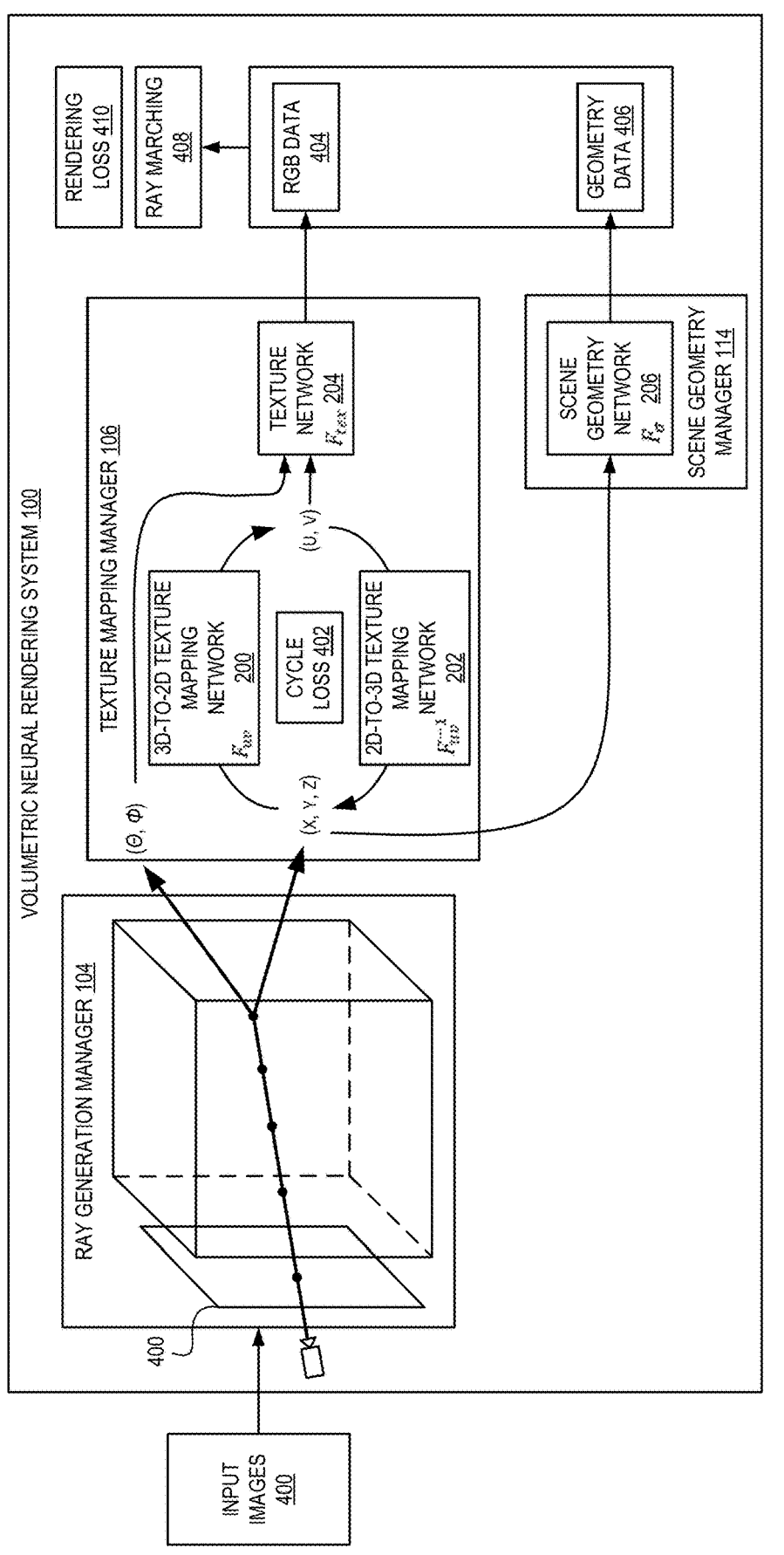
FIG. 4 illustrates an example of a volumetric neural rendering system in accordance with one or more embodiments.

FIG. 4 illustrates an example of a volumetric neural rendering system in accordance with one or more embodiments. As discussed, embodiments may be implemented based on a rendering pipeline called differentiable ray marching, where, instead of using a mesh, a neural network is used to regress the volume at any point. The properties required by this process may include the radiance or color at any point in the space and the volume density at any point in the space. The volume density indicates if there is anything at a point (and if so, its density), and then the radiance (e.g., RGB) indicates the color at that point. As discussed, prior techniques used a single network to encode color and volume density, which does not allow for the appearance of the resulting object to be edited.

As shown in FIG. 4, embodiments include a disentangled neural representation comprising multiple neural networks (e.g., MLPs, CNNs, or combinations of these and/or other neural networks) for neural volumetric rendering. As in prior techniques, such as NeRF, for geometry an scene geometry network $F_\sigma$ 206 is used to regress volume density $\sigma$ at any 3D point x=(x, y, z). In contrast to prior techniques, for appearance, a plurality of models are used. For example, a 3D-to-2D texture mapping network $F_{uv}$ 200 is used to map 3D points to 2D texture UV coordinates, u=(u, v), and a texture network $F_{tex}$ 204 is used to regress the 2D view-dependent radiance in the UV space given a UV u and a viewpoint d=(θ; φ).

In some embodiments, the networks of volumetric neural rendering system 100 are trained for a specific scene. Input images 400 may include images of the scene captured from various viewpoints. The images may be captured by a user using an image capture device. This may be performed freehand (e.g., the user holding the image capture device and capturing images from different viewpoints) or via a computer-controlled mount (e.g., a robotic arm) which allows for precise positioning of the image capture device during image capture. During training, an inverse 2D-to-3D_texture mapping network $$F_{uv}^{-1}$$

202 maps UV coordinates back to 3D points. As discussed, a cycle loss is used to ensure consistency between the 3D-to-2D mapping $F_{uv}$ and the 2D-to-3D $$F_{uv}^{-1}$$

mapping at points on the object surface. This enables meaningful surface reasoning and texture space discovery. For example, using a cycle loss function forces the networks to learn to map the whole space and not collapse into mapping into a single or small number of points. The meaningfulness of the UV space learned by $F_{uv}$ is demonstrated by rendering the object with a uniform checkerboard texture as discussed above and shown in FIG. 3.

Volume rendering requires volume density $\sigma$ and radiance c at all 3D locations in a scene. A pixel's radiance value (RGB color) I is computed by marching a ray from the pixel and aggregating the radiance values $c_i$ of multiple shading points on the ray, as expressed by:

$$I = \sum_i T_i(1 - \exp(-\sigma_i\delta_i))c_i$$

$$T_i = \exp\left(-\sum_{j=1}^{i-1} \sigma_j\delta_j\right)$$

where i=1, . . . , N denotes the index of a shading point on the ray, $\delta_i$ represents the distance between two consecutive points, $T_i$ is known as the transmittance, and $c_i$ and $\sigma_i$ are the radiance and volume density (e.g., extinction coefficient), respectively, at shading point i. The above ray marching process is derived as a discretization of a continuous volume rendering integral.

In the context of view synthesis, a general volume scene representation can be seen as a 5D function (e.g., a radiance field):

$$F_{\sigma,c}: (x, d) \rightarrow (\sigma, c)$$

which outputs volume density and radiance $(\sigma, c)$ given a 3D location x=(x, y, z) and viewpoint d=(θ, φ). As discussed, prior techniques use a single MLP network to represent $F_{\sigma, c}$ as a neural radiance field and achieves photorealistic rendering results. Their single network encapsulates the entire scene geometry and appearance as a whole; however, this "bakes" the scene content into the trained network, and does not allow for any applications (e.g., appearance editing) beyond pure view synthesis.

In contrast, embodiments explicitly decompose the radiance field $F_{\sigma, c}$ into two components, $F_\sigma$ and $F_c$, modeling geometry and appearance, respectively:

$$F_\sigma: x \rightarrow \sigma, F_c:(x, d) \rightarrow c$$

In particular, $F_\sigma$ regresses volume density (i.e., scene geometry), and $F_c$ regresses radiance (i.e., scene appearance). As discussed, these are implemented as two independent networks.

Embodiments model scene appearance in a 2D texture space that explains the object's 2D appearance. Embodiments map a 3D point x=(x, y, z) in a volume onto a 2D UV coordinate u=(u, v) in a texture, and regress the radiance in the texture space given 2D UV coordinates and a viewpoint (u, d). Embodiments describe the 3D-to-2D mapping as a texture mapping function $F_{uv}$ and the radiance regression as a texture function $F_{tex}$:

$$F_{u,v}: x \rightarrow u, F_{tex}: (u, d) \rightarrow c$$

The appearance function $F_c$ is thus a composition of the two functions:

$$F_c(x, d) = F_{tex}(F_{u,v}(x), d)$$

In summary, the full radiance field is a composition of three functions: a geometry function $F_\sigma$, a texture mapping function $F_{uv}$, and a texture function $F_{tex}$, given by:

$$(\sigma, c) = F_{\sigma,c}(x, d) = (F_\sigma(x), F_{tex}(F_{u,v}(x), d))$$

As described above, the texture space is parameterized by a 2D UV coordinate u=(u, v). While any continuous 2D topology can be used for the UV space, embodiments use a 2D unit sphere for most results, where u is interpreted as a point on the unit sphere.

As discussed, directly training the representation networks ($F_\sigma$, $F_{uv}$, $F_{tex}$) with pure rendering supervision often leads to a highly distorted texture space and degenerate cases where multiple points map to the same UV coordinate, which is undesirable. The ideal goal is instead to uniformly map the 2D surface onto the texture space and occupy the entire texture space. To achieve this, embodiments jointly train an "inverse" texture mapping network $$F_{uv}^{-1}$$

that maps a 2D UV coordinate u on the texture to a 3D point x in the volume:

$$F_{uv}^{-1} : u \rightarrow x$$

$$F_{uv}^{-1}$$

projects the 2D texture space onto a 2D manifold (in 3D space). This inverse texture mapping allows the volumetric neural rendering system 100 to reason about the 2D surface of the scene (corresponding to the inferred texture) and regularize the texture mapping process. Embodiments leverage the texture mapping and inverse mapping networks to build a cycle mapping (e.g., a one-to-one correspondence) between the 2D object surface and the texture space, leading to high-quality texture mapping.

During training, the full network, including networks 200-206, is trained end-to-end, to simultaneously achieve surface discovery, space mapping, and scene geometry and appearance inference. A rendering loss 410 is calculated comparing the ground truth radiance values to the synthesized radiance values. For example, a view corresponding to a ground truth image (e.g., from the input images or a reserved validation image) is synthesized. Ray marching 408 is then performed on the synthesized image to obtain the rendered pixel radiance values I which are compared to the ground truth pixel radiance value Igt in the captured images to compute the rendered loss value:

$$L_{render} = \|I_{gt} - I\|_2^2$$

Additionally, a cycle loss 402 is applied to the texture mapping and inverse texture mapping networks to train these networks to learn to consistently map 3D points to 2D texture space coordinates. Given any sampled shading point $x_i$ on a ray in ray marching, the texture mapping network 200 finds its UV $u_i$ in texture space for radiance regression. Embodiments use the inverse mapping network 202 to map this UV $u_i$ back to the 3D space:

$$x_i' = F_{uv}^{-1}(F_{uv}(x_i))$$

Embodiments minimize the difference between $$x_i'$$

and $x_i$ to enforce a cycle mapping between the texture and the world spaces (and force $$F_{uv}^{-1}$$

to learn the inverse of $F_{uv}$). However, it is unnecessary and unreasonable to enforce acycle mapping at any 3D point. As such, embodiments only expect a correspondence between the texture space and points on the 2D surface of the scene; enforcing the cycle mapping in the empty space away from the surface is meaningless. 3D points near the scene surface are expected to have high contributions to the radiance. Therefore, the radiance contribution weights per shading point are leveraged to weigh the cycle loss. Specifically, the weight can be represented as:

$$w_i = T_i(1 - \exp(-\sigma_i\delta_i))$$

which determines the contribution to the final pixel color for each shading point i in the ray marching equation described above. The ray marching equation can then be reduced to $I=w_ic_i$. This contribution weight $w_i$ naturally expresses how close a point is to the surface and has been previously used for depth inference. The cycle loss for a single ray is given by $$L_{cycle} = \sum_i w_i \left\| F_{uv}^{-1}(F_{uv}(x_i)) - x_i \right\|_2^2$$

Embodiments also additionally provide a loss to supervise a foreground-background mask. Basically, the transmittance of the last shading point $T_N$ on a pixel ray indicates if the pixel is part of the background. The ground truth mask $M_{gt}$ per pixel is used to supervise this by $$L_{mask} = \left\| M_{gt} - (1 - T_N) \right\|_2^2$$

This mask loss is necessary when viewpoints do not cover the object entirely. In such cases, the network can use the volume density to darken (e.g., when the background is black) renderings and fake some shading effects that should be in the texture. When the view coverage is dense enough around an object, this mask loss is often optional.

Accordingly, the full loss during training becomes:

$$L = L_{render} + \alpha_1 L_{cycle} + \alpha_2 L_{mask}$$

In some embodiments, $\alpha_1$ and $\alpha_2$ are adjustable as needed based on desired performance, convergence speed, etc. For example, in some embodiments, $\alpha_1=1$ was found to perform suitably in experiments and $\alpha_2=1$ was found to work for most scenes, except for those that already have good view coverage, in which case the mask loss could be removed by setting $\alpha_2=0$.

Figure 5:
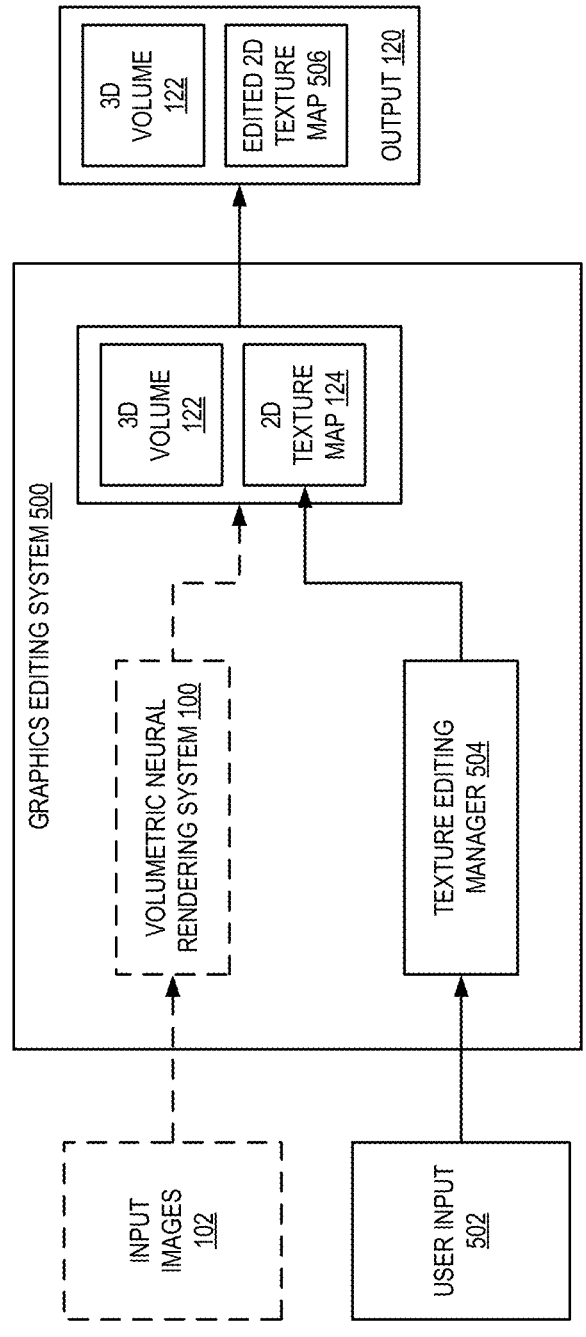
FIG. 5 illustrates an example of editing a neural scene representation in accordance with one or more embodiments.

FIG. 5 illustrates an example of editing a neural scene representation in accordance with one or more embodiments. As discussed, techniques described herein enable the appearance to be disentangled from the object, allowing for the appearance to be edited using conventional techniques. Accordingly, in some embodiments, a user can provide a plurality of input images 102 to train the networks of volumetric neural rendering system 100 to generate a 3D volume 122 and 2D texture map 124 representation of the scene depicted in the input images. As shown in FIG. 5, optionally, the volumetric neural rendering system 100 is implemented as part of graphics editing system 500. Alternatively, the volumetric neural rendering system 100 is implemented as a separate system which provides at least the 2D texture map 124 to the graphics editing system 500 to be edited by the user.

Once the 2D texture map 124 representing the 3D appearance of the object represented in the scene has been obtained by graphics editing system 500, the texture map can be edited by the user. For example, a user input 502 can be received by a texture editing manager 504 of the graphics editing system 500. The user input can include any texture editing inputs as are known in the art and may include directly editing the 2D texture map 124, generating a new texture map that is combined with the 2D texture map, etc. Once the texture editing is complete, the edited texture map 506 is output and can be used to synthesize arbitrary views of the scene based on a provided viewpoint.

FIG. 6 illustrates an example of neural texture editing in accordance with one or more embodiments. FIG. 6 shows example results of a captured scene of a plush cube. As shown, input 600 represents one input image used to train the volumetric neural rendering system for this scene. As discussed, the input images can include tens or hundreds of images of the scene from various view directions. Once trained, the volumetric neural rendering system can synthesize realistic view synthesis results that are very close to the ground truth. In addition, as discussed above, embodiments unwrap the object surface into a reasonable texture, as shown at texture map 602 (e.g., a 3D appearance representation). The discovered texture space meaningfully expresses the 2D surface and distributes uniformly, as discussed above.

The texture mapping enables flexible appearance editing applications as shown in edited texture map 604 and texture edit views 606. In these examples, a specified full texture map is used to modulate the original texture, which changes the object's appearance. For example, numbers are added to each face of the cube. This appearance editing is performed directly in the texture space, which changes the essential 3D appearance and naturally appears consistent across multiple viewpoints, as shown in views 606.

FIG. 7 illustrates a schematic diagram of volumetric neural rendering system (e.g., "volumetric neural rendering system" described above) in accordance with one or more embodiments. As shown, the volumetric neural rendering system 700 may include, but is not limited to, user interface manager 702, training manager 704, ray generation manager 705, neural network manager 706, and storage manager 708. The neural network manager 706 includes a texture mapping network 710, an inverse texture mapping network 712, a texture network 714, and a scene geometry network 716. The storage manager 708 includes input images 718, output texture map 720, output 3D volume 722, and edited texture map 724.

As illustrated in FIG. 7, the volumetric neural rendering system 700 includes a user interface manager 702. For example, the user interface manager 702 allows users to provide input image data to the volumetric neural rendering system 700. In some embodiments, the user interface manager 702 provides a user interface through which the user can upload the input images 718 which represent the scene, as discussed above. Alternatively, or additionally, the user interface may enable the user to download the images from a local or remote storage location (e.g., by providing an address (e.g., a URL or other endpoint) associated with an image source). In some embodiments, the user interface can enable a user to link an image capture device, such as a camera or other hardware to capture image data and provide it to the volumetric neural rendering system 700. In some embodiments, the user interface manager 702 also enables the user to provide a specific viewpoint for a view to be synthesized. Additionally, the user interface manager 702 allows users to request the volumetric neural rendering system 700 to neural texture mapping for volumetric neural rendering on the input images. In some embodiments, the user interface manager 702 enables the user to edit the resulting texture in texture space. Alternatively, the texture map be edited in a graphic design system separate from the volumetric neural rendering system 700, as discussed above.

As illustrated in FIG. 7 the volumetric neural rendering system 700 also includes training manager 704. The training manager 704 can teach, guide, tune, and/or train one or more neural networks. In particular, the training manager 704 can train a neural network based on a plurality of training data (e.g., input images 718). As discussed, the input images 718 may include a plurality of images of a scene captured from a variety of viewpoints. More specifically, the training manager 704 can access, identify, generate, create, and/or determine training input and utilize the training input to train and fine-tune a neural network. For instance, the training manager 704 can train the texture mapping network 710, inverse texture mapping network 712, texture network 714, and scene geometry network 716, end-to-end, as discussed above. As discussed, in some embodiments, the networks are trained specifically for each scene. For example, a new network is trained (or the existing network retrained) to model a difference scene.

As illustrated in FIG. 7, the volumetric neural rendering system 700 also includes a ray generation manager 705. As discussed, a ray generation manager implements ray marching techniques to generate a ray that is marched through each pixel, and sample the ray at a plurality of 3D shading points. The ray generation manager 705 can generate a plurality of rays which are marched and sampled accordingly. The resulting sampled points are provided to the neural networks to process scene geometry and appearance, as discussed.

As illustrated in FIG. 7, the volumetric neural rendering system 700 also includes a neural network manager 706.

Neural network manager 706 may host a plurality of neural networks or other machine learning models, such as texture mapping network 710, an inverse texture mapping network 712, a texture network 714, and a scene geometry network 716. The neural network manager 706 may include an execution environment, libraries, and/or any other data needed to execute the machine learning models. In some embodiments, the neural network manager 706 may be associated with dedicated software and/or hardware resources to execute the machine learning models. As discussed, texture mapping network 710, inverse texture mapping network 712, texture network 714, and scene geometry network 716 can be implemented as MLPs, CNNs or combinations of these or other types of neural networks.

Although depicted in FIG. 7 as being hosted by a single neural network manager 706, in various embodiments the neural networks may be hosted in multiple neural network managers and/or as part of different components. For example, as discussed, a texture mapping manager (such as texture mapping manager 106) can host texture mapping network 710, inverse texture mapping network 712, and texture network 714. Similarly, a scene geometry manager (such as scene geometry manager 114) can host scene geometry network 716. In various embodiments, the texture mapping manager and scene geometry manager can each include their own neural network manager, or other host environment, in which the respective neural networks execute.

In some embodiments, the four sub-networks, texture mapping network 710, inverse texture mapping network 712, texture network 714, and scene geometry network 716, are designed as MLP networks. Embodiments use unit vectors to represent viewpoint d and UV coordinate u (for spherical UV). Embodiments use positional encoding to infer high-frequency geometry and appearance details. In particular, embodiments apply positional encoding for the scene geometry network 716 and texture network 714 on all their input components including x, u and d. On the other hand, since the texture mapping is expected to be smooth and uniform, embodiments do not apply positional encoding on the two texture mapping networks 710 and 712.

As illustrated in FIG. 7, the volumetric neural rendering system 700 also includes the storage manager 708. The storage manager 708 maintains data for the volumetric neural rendering system 700. The storage manager 708 can maintain data of any type, size, or kind as necessary to perform the functions of the volumetric neural rendering system 700. The storage manager 708, as shown in FIG. 7, includes the input images 718. The input images 718 can include a plurality of digital training images associated with a scene, as discussed in additional detail above. In particular, in one or more embodiments, the input images 718 include digital training images utilized by the training manager 704 to train the plurality of neural networks to generate a disentangled neural texture and 3D model for the object depicted in the scene.

As further illustrated in FIG. 7, the storage manager 708 also includes output texture map 720 and output 3D volume 722. Output texture map 720 is a neural texture map that captures the appearance of the surface of the object depicted in the scene. The texture map provides consistent coverage over the 3D model due to the use of inverse texture mapping network 712 to ensure the 3D-to-2D mapping is not degenerate. The output texture map 720 can be edited using conventional texture editing techniques (e.g., to generate edited texture map 724) to change the appearance of the object. The output 3D volume 722 captures the geometry of the object via regressed density values obtained from the scene geometry network. The storage manager 708 may also include edited texture map 724. The edited texture map 724 may include a modified version of the output texture map 720. The edited texture map 724 may have been edited using conventional texture editing techniques via a graphic design application. For example, a new texture map may be combined with the output texture map to generate the edited texture map 724.

Each of the components 702-708 of the volumetric neural rendering system 700 and their corresponding elements (as shown in FIG. 7) may be in communication with one another using any suitable communication technologies. It will be recognized that although components 702-708 and their corresponding elements are shown to be separate in FIG. 7, any of components 702-708 and their corresponding elements may be combined into fewer components, such as into a single facility or module, divided into more components, or configured into different components as may serve a particular embodiment.

The components 702-708 and their corresponding elements can comprise software, hardware, or both. For example, the components 702-708 and their corresponding elements can comprise one or more instructions stored on a computer-readable storage medium and executable by processors of one or more computing devices. When executed by the one or more processors, the computer-executable instructions of the volumetric neural rendering system 700 can cause a client device and/or a server device to perform the methods described herein. Alternatively, the components 702-708 and their corresponding elements can comprise hardware, such as a special purpose processing device to perform a certain function or group of functions. Additionally, the components 702-708 and their corresponding elements can comprise a combination of computer-executable instructions and hardware.

Furthermore, the components 702-708 of the volumetric neural rendering system 700 may, for example, be implemented as one or more stand-alone applications, as one or more modules of an application, as one or more plug-ins, as one or more library functions or functions that may be called by other applications, and/or as a cloud-computing model. Thus, the components 702-708 of the volumetric neural rendering system 700 may be implemented as a stand-alone application, such as a desktop or mobile application. Furthermore, the components 702-708 of the volumetric neural rendering system 700 may be implemented as one or more web-based applications hosted on a remote server. Alternatively, or additionally, the components of the volumetric neural rendering system 700 may be implemented in a suit of mobile device applications or "apps." To illustrate, the components of the volumetric neural rendering system 700 may be implemented as part of an application, or suite of applications, including but not limited to ADOBE CREATIVE CLOUD, ADOBE PHOTOSHOP, ADOBE ACROBAT, ADOBE ILLUSTRATOR, ADOBE LIGHTROOM and ADOBE INDESIGN. "ADOBE", "CREATIVE CLOUD," "PHOTOSHOP," "ACROBAT," "ILLUSTRATOR," "LIGHTROOM," and "INDESIGN" are either registered trademarks or trademarks of Adobe Inc. in the United States and/or other countries.

FIGS. 1-7, the corresponding text, and the examples, provide a number of different systems and devices that enable volumetric neural rendering that disentangles appearance from geometry, allowing the appearance of resulting models to be readily edited. In addition to the foregoing, embodiments can also be described in terms of flowcharts comprising acts and steps in a method for accomplishing a particular result. For example, FIGS. 8 and 9 illustrate flowcharts of exemplary methods in accordance with one or more embodiments. The methods described in relation to FIGS. 8 and 9 may be performed with fewer or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart 800 of a series of acts in a method of neural volumetric rendering in accordance with one or more embodiments. In one or more embodiments, the method 800 is performed in a digital medium environment that includes the volumetric neural rendering system 100. The method 800 is intended to be illustrative of one or more methods in accordance with the present disclosure and is not intended to limit potential embodiments. Alternative embodiments can include additional, fewer, or different steps than those articulated in FIG. 8.

As illustrated in FIG. 8, the method 800 includes an act 802 of obtaining a plurality of images of a scene depicting at least one object. As discussed, the plurality of images may include tens to hundreds of images of the scene captured from different viewpoints. The images may include digital images, frames of digital videos, or other visual content.

As illustrated in FIG. 8, the method 800 includes an act 804 determining a volume density of the scene using a first neural network to generate a 3D geometric representation of the object. In some embodiments, the first neural network is a scene geometry neural network trained to regress a volume density at a 3D point in the scene. The volume density indicates whether there is something located at that point and, if so, its density. As such, the scene geometry neural network can regress a 3D model of the scene from an arbitrary viewpoint.

As illustrated in FIG. 8, the method 800 includes an act 806 mapping 3D points of the scene to a 2D texture space using a second neural network. As discussed, the second neural network is a texture mapping neural network that maps the 3D points of the scene to 2D coordinates in the texture space. This allows for the appearance of the object to be disentangled from the 3D model of the object, and further enables conventional editing techniques to be used to modify the appearance of the object by directly modifying the resulting texture map. However, to avoid degenerate mappings, the second neural network is trained on a cycle loss based on a fourth neural network that maps back from the 2D texture space to 3D points. For example, the fourth neural network is an inverse texture mapping network. By using an inverse texture mapping network, the texture mapping network is forced to learn a consistent mapping of the 3D space that does not result in multiple points mapping to the same point in the texture space.

As illustrated in FIG. 8, the method 800 includes an act 808 determining radiance values for each 2D point in the 2D texture space from a plurality of viewpoints using a third neural network to generate a 3D appearance representation of the object. In some embodiments, the representation of the 3D appearance representation of the object is a texture map. As discussed, the third neural network is a texture network which receives a viewpoint and the 2D coordinates from the texture mapping network and regresses radiance values at that coordinate from the input viewpoint. The radiance value indicates the color (e.g., RGB value) at that point. In some embodiments, the third neural network is trained on a rendering loss determined based on a difference between the radiance values determined by the third neural network and ground truth radiance values obtained from a ground truth image. As discussed, the volumetric neural rendering system can be trained end to end on the cycle loss, rendering loss, and a mask loss.

In various embodiments, the volumetric neural rendering system includes a plurality of sub networks (e.g., the first neural network, second neural network, third neural network, and fourth neural networks). The neural networks may be implemented as multilayer perceptrons, convolutional neural networks, or combinations of these and other types of neural networks.

In some embodiments, the method further includes receiving a request to modify the 3D appearance representation of the object, and modifying the texture map based on the request. For example, a graphic design system can implement the volumetric neural rendering system or receive the texture map generated by the volumetric neural rendering system and enable a user to modify the texture map. For example, modifying the 2D texture space based on the request, may include combining the texture map with a new texture map included with the request to generate a modified texture map. With the texture map modified, arbitrary views of the object can be synthesized having a modified appearance. For example, the method may include receiving a viewpoint, and generating a synthetic view of the scene based on the viewpoint using the 3D geometric representation of the object and the modified texture map.

FIG. 9 illustrates a flowchart of a series of acts in a method of neural texture editing in accordance with one or more embodiments. In one or more embodiments, the method 900 is performed in a digital medium environment that includes the volumetric neural rendering system 100. The method 900 is intended to be illustrative of one or more methods in accordance with the present disclosure and is not intended to limit potential embodiments. Alternative embodiments can include additional, fewer, or different steps than those articulated in FIG. 9.

As illustrated in FIG. 9, the method 900 includes an act 902 of receiving a request to edit a texture map generated by a volumetric neural rendering system including a plurality of neural networks, wherein the volumetric neural rendering system generates the texture map representing an appearance of an object in a scene separately from a 3D geometric representation of the object.

In some embodiments, the volumetric neural rendering system includes a scene geometry neural network to generate a 3D geometric representation of the object, a texture mapping neural network to map 3D points of the scene to a 2D texture space, an inverse texture mapping neural network to map back from the 2D texture space to the 3D points, and a texture network to determine radiance values for each 2D point in the 2D texture space from a plurality of viewpoints to generate the texture map. In some embodiments, the volumetric neural rendering system is trained using a plurality of images of the scene that depict the object, wherein the plurality of images of the scene are captured from a plurality of viewpoints.

As illustrated in FIG. 9, the method 900 includes an act 904 of obtaining the texture map. For example, a texture map may be generated by a volumetric neural rendering system, as discussed above. The volumetric neural rendering system may be implemented as part of a graphic design system or may be implemented as a separate system which makes the texture map available to a graphic design system for editing.

As illustrated in FIG. 9, the method 900 includes an act 906 of generating a modified texture map based on the texture map and the request. In some embodiments, generating a modified texture map further includes receiving a new texture map, and combining the texture map with the new texture map to generate the modified texture map.

Figure 10:
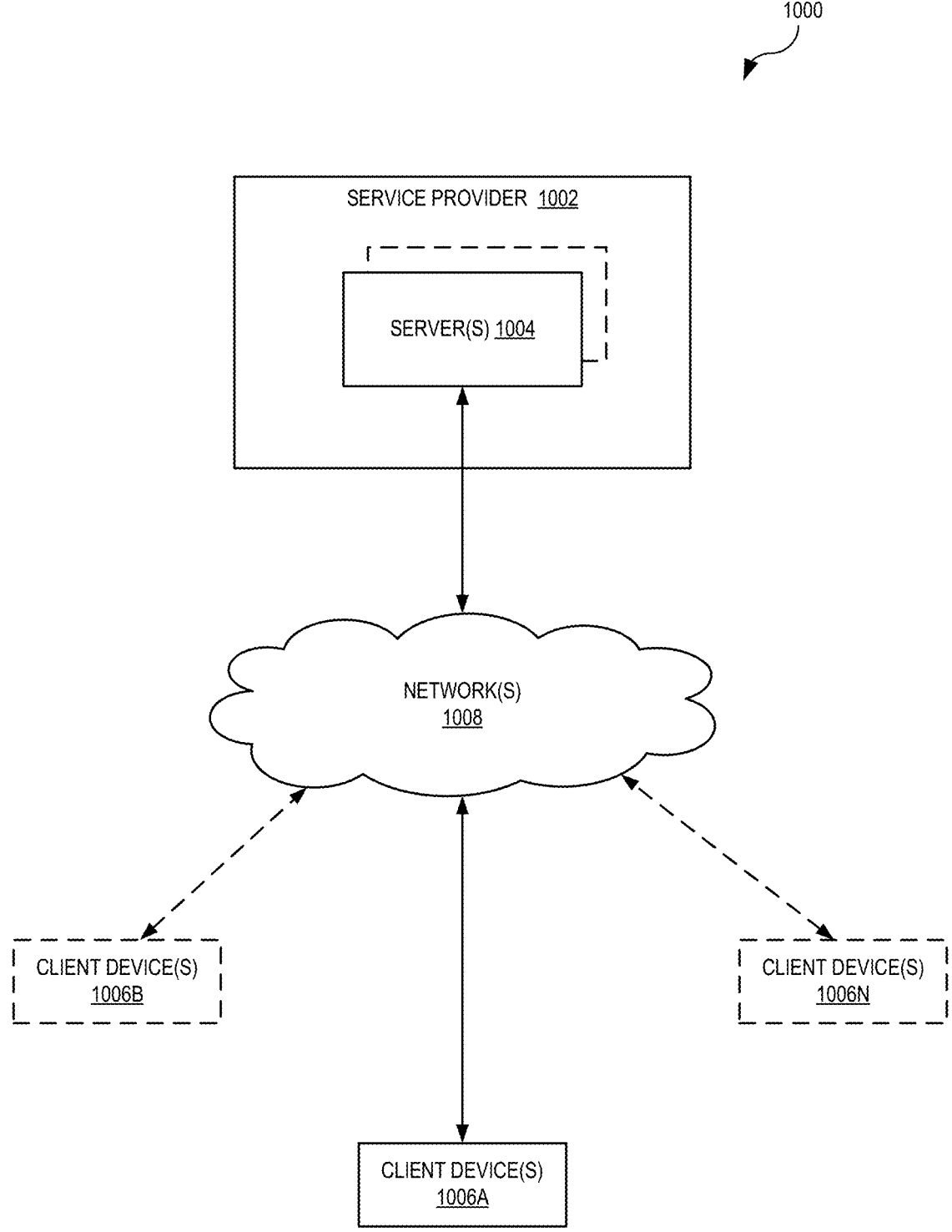
FIG. 10 illustrates a schematic diagram of an exemplary environment in which the image processing system can operate in accordance with one or more embodiments.

FIG. 10 illustrates a schematic diagram of an exemplary environment 1000 in which the volumetric neural rendering system 700 can operate in accordance with one or more embodiments. In one or more embodiments, the environment 1000 includes a service provider 1002 which may include one or more servers 1004 connected to a plurality of client devices 1006A-1006N via one or more networks 1008. The client devices 1006A-1006N, the one or more networks 1008, the service provider 1002, and the one or more servers 1004 may communicate with each other or other components using any communication platforms and technologies suitable for transporting data and/or communication signals, including any known communication technologies, devices, media, and protocols supportive of remote data communications, examples of which will be described in more detail below with respect to FIG. 11.

Although FIG. 10 illustrates a particular arrangement of the client devices 1006A-1006N, the one or more networks 1008, the service provider 1002, and the one or more servers 1004, various additional arrangements are possible. For example, the client devices 1006A-1006N may directly communicate with the one or more servers 1004, bypassing the network 1008. Or alternatively, the client devices 1006A-1006N may directly communicate with each other. The service provider 1002 may be a public cloud service provider which owns and operates their own infrastructure in one or more data centers and provides this infrastructure to customers and end users on demand to host applications on the one or more servers 1004. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1004. In some embodiments, the service provider may be a private cloud provider which maintains cloud infrastructure for a single organization. The one or more servers 1004 may similarly include one or more hardware servers, each with its own computing resources, which are divided among applications hosted by the one or more servers for use by members of the organization or their customers.

Similarly, although the environment 1000 of FIG. 10 is depicted as having various components, the environment 1000 may have additional or alternative components. For example, the environment 1000 can be implemented on a single computing device with the volumetric neural rendering system 700. In particular, the volumetric neural rendering system 700 may be implemented in whole or in part on the client device 1002A.

As illustrated in FIG. 10, the environment 1000 may include client devices 1006A-1006N. The client devices 1006A-1006N may comprise any computing device. For example, client devices 1006A-1006N may comprise one or more personal computers, laptop computers, mobile devices, mobile phones, tablets, special purpose computers, TVs, or other computing devices, including computing devices described below with regard to FIG. 11. Although three client devices are shown in FIG. 10, it will be appreciated that client devices 1006A-1006N may comprise any number of client devices (greater or smaller than shown).

Moreover, as illustrated in FIG. 10, the client devices 1006A-1006N and the one or more servers 1004 may communicate via one or more networks 1008. The one or more networks 1008 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1008 may be any suitable network over which the client devices 1006A-1006N may access service provider 1002 and server 1004, or vice versa. The one or more networks 1008 will be discussed in more detail below with regard to FIG. 11.

In addition, the environment 1000 may also include one or more servers 1004. The one or more servers 1004 may generate, store, receive, and transmit any type of data, including input images 718, output texture map 720, output 3D volume 722, edited texture map 724, or other information. For example, a server 1004 may receive data from a client device, such as the client device 1006A, and send the data to another client device, such as the client device 1002B and/or 1002N. The server 1004 can also transmit electronic messages between one or more users of the environment 1000. In one example embodiment, the server 1004 is a data server. The server 1004 can also comprise a communication server or a web-hosting server. Additional details regarding the server 1004 will be discussed below with respect to FIG. 11.

As mentioned, in one or more embodiments, the one or more servers 1004 can include or implement at least a portion of the volumetric neural rendering system 700. In particular, the volumetric neural rendering system 700 can comprise an application running on the one or more servers 1004 or a portion of the volumetric neural rendering system 700 can be downloaded from the one or more servers 1004. For example, the volumetric neural rendering system 700 can include a web hosting application that allows the client devices 1006A-1006N to interact with content hosted at the one or more servers 1004. To illustrate, in one or more embodiments of the environment 1000, one or more client devices 1006A-1006N can access a webpage supported by the one or more servers 1004. In particular, the client device 1006A can run a web application (e.g., a web browser) to allow a user to access, view, and/or interact with a webpage or website hosted at the one or more servers 1004.

Upon the client device 1006A accessing a webpage or other web application hosted at the one or more servers 1004, in one or more embodiments, the one or more servers 1004 can provide access to one or more digital images (e.g., the input image data 718, such as camera roll or an individual's personal photos) stored at the one or more servers 1004. Moreover, the client device 1006A can receive a request (i.e., via user input) to perform neural texture mapping and provide the request to the one or more servers 1004. Upon receiving the request, the one or more servers 1004 can automatically perform the methods and processes described above. The one or more servers 1004 can provide all or portions of the 2D and/or 3D representations, to the client device 1006A for display to the user. The one or more servers can also host a graphic design application used to edit the texture map to change the appearance of the 3D object.

As just described, the volumetric neural rendering system 700 may be implemented in whole, or in part, by the individual elements 1002-1008 of the environment 1000. It will be appreciated that although certain components of the volumetric neural rendering system 700 are described in the previous examples with regard to particular elements of the environment 1000, various alternative implementations are possible. For instance, in one or more embodiments, the volumetric neural rendering system 700 is implemented on any of the client devices 1006A-N. Similarly, in one or more embodiments, the volumetric neural rendering system 700 may be implemented on the one or more servers 1004. Moreover, different components and functions of the volumetric neural rendering system 700 may be implemented separately among client devices 1006A-1006N, the one or more servers 1004, and the network 1008.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
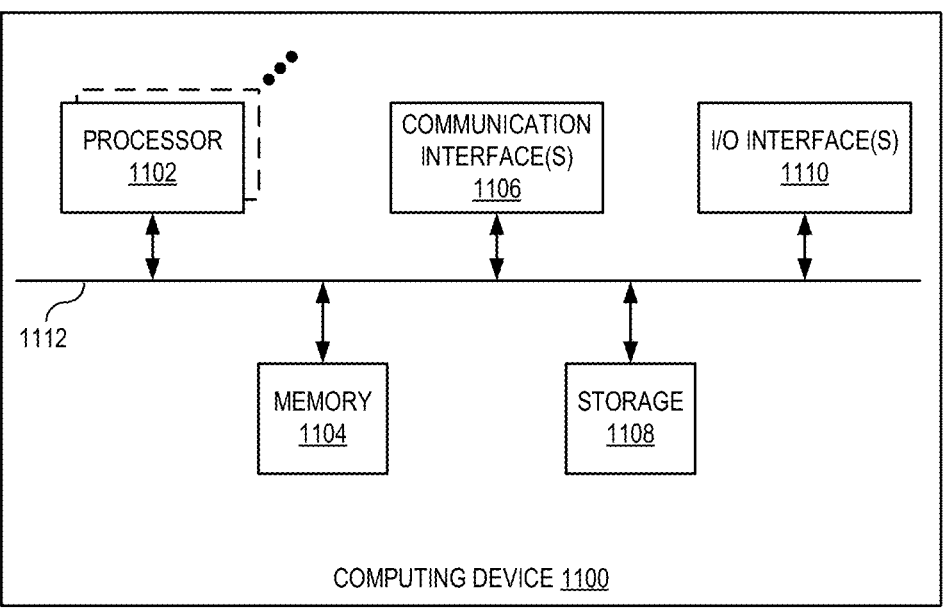
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that one or more computing devices such as the computing device 1100 may implement the image processing system. As shown by FIG. 11, the computing device can comprise a processor 1102, memory 1104, one or more communication interfaces 1106, a storage device 1108, and one or more I/O devices/interfaces 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1108 and decode and execute them. In various embodiments, the processor(s) 1102 may include one or more central processing units (CPUs), graphics processing units (GPUs), field programmable gate arrays (FPGAs), systems on chip (SoC), or other processor(s) or combinations of processors.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 can further include one or more communication interfaces 1106. A communication interface 1106 can include hardware, software, or both. The communication interface 1106 can provide one or more interfaces for communication (such as, for example, packet-based communication) between the computing device and one or more other computing devices 1100 or one or more networks. As an example and not by way of limitation, communication interface 1106 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

The computing device 1100 includes a storage device 1108 includes storage for storing data or instructions. As an example, and not by way of limitation, storage device 1108 can comprise a non-transitory storage medium described above. The storage device 1108 may include a hard disk drive (HDD), flash memory, a Universal Serial Bus (USB) drive or a combination these or other storage devices. The computing device 1100 also includes one or more input or output ("I/O") devices/interfaces 1110, which are provided to allow a user to provide input to (such as user strokes), receive output from, and otherwise transfer data to and from the computing device 1100. These I/O devices/interfaces 1110 may include a mouse, keypad or a keyboard, a touch screen, camera, optical scanner, network interface, modem, other known I/O devices or a combination of such I/O devices/interfaces 1110. The touch screen may be activated with a stylus or a finger.

The I/O devices/interfaces 1110 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1110 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
    receiving a request to edit an appearance of an object, wherein the appearance of the object is generated by a texture mapping network of a volumetric neural rendering system, wherein texture mapping network is trained on a cycle loss using an inverse texture mapping network to enforce a mapping between the appearance of the object and surface points on the object, wherein the texture mapping network maps a 3D point to a 2D texture space and the inverse texture mapping network maps the 2D texture space back to the 3D point;
    obtaining a texture map corresponding to the appearance of the object; and
    editing the texture map based on the request.

2. The method of claim 1, wherein receiving a request to edit an appearance of an object, further comprises:
    receiving a request to edit the texture map corresponding to the appearance of the object.

3. The method of claim 1, wherein editing the texture map based on the request, further comprises:
    modifying the texture map based on the request to create a modified texture map.

4. The method of claim 3, wherein modifying the texture map based on the request to create a modified texture map includes:
    replacing the texture map with a new texture map, wherein the modified texture map is the new texture map.

5. The method of claim 3, wherein modifying the texture map based on the request to create a modified texture map includes:
    combining the texture map with one or more changes included in the request to edit the appearance of the object to create a new texture map.

6. The method of claim 1, wherein the volumetric neural rendering system generates a 3D geometric representation of the object and separately generates a 3D appearance representation of the object.

7. The method of claim 6, wherein to generate the 3D geometric representation of the object and separately generate the 3D appearance representation of the object, the volumetric neural rendering system is configured to:
    obtain a plurality of images of a scene depicting the object;
    determine a volume density of the scene using a scene geometry network to generate the 3D geometric representation of the object;
    map 3D points of the scene to the 2D texture space using the texture mapping network; and
    determine radiance values for each 2D point in the 2D texture space from a plurality of viewpoints using a texture network to generate the 3D appearance representation of the object.

8. A non-transitory computer-readable medium storing executable instructions, which when executed by a processing device, cause the processing device to perform operations comprising:
    receiving a request to edit an appearance of an object, wherein the appearance of the object is generated by a texture mapping network of a volumetric neural rendering system, wherein texture mapping network is trained on a cycle loss using an inverse texture mapping network to enforce a mapping between the appearance of the object and surface points on the object, wherein the texture mapping network maps a 3D point to a 2D texture space and the inverse texture mapping network maps the 2D texture space back to the 3D point;
    obtaining a texture map corresponding to the appearance of the object; and
    editing the texture map based on the request.

9. The non-transitory computer-readable medium of claim 8, wherein the operation of receiving a request to edit an appearance of an object, further comprises:
    receiving a request to edit the texture map corresponding to the appearance of the object.

10. The non-transitory computer-readable medium of claim 8, wherein the operation of editing the texture map based on the request, further comprises:
    modifying the texture map based on the request to create a modified texture map.

11. The non-transitory computer-readable medium of claim 10, wherein the operation of modifying the texture map based on the request to create a modified texture map includes:
    replacing the texture map with a new texture map, wherein the modified texture map is the new texture map.

12. The non-transitory computer-readable medium of claim 10, wherein the operation of modifying the texture map based on the request to create a modified texture map includes:

combining the texture map with one or more changes included in the request to edit the appearance of the object to create a new texture map.

13. The non-transitory computer-readable medium of claim 8, wherein the volumetric neural rendering system generates a 3D geometric representation of the object and separately generates a 3D appearance representation of the object.

14. The non-transitory computer-readable medium of claim 13, wherein to generate the 3D geometric representation of the object and separately generate the 3D appearance representation of the object, the volumetric neural rendering system is configured to:

obtain a plurality of images of a scene depicting the object;

determine a volume density of the scene using a scene geometry network to generate the 3D geometric representation of the object;

map 3D points of the scene to the 2D texture space using the texture mapping network; and determine radiance values for each 2D point in the 2D texture space from a plurality of viewpoints using a texture network to generate the 3D appearance representation of the object.

15. A system comprising:

a memory component; and a processing device coupled to the memory component, the processing device to perform operations comprising:

receiving a request to edit an appearance of an object, wherein the appearance of the object is generated by a texture mapping network of a volumetric neural rendering system, wherein texture mapping network is trained on a cycle loss using an inverse texture mapping network to enforce a mapping between the appearance of the object and surface points on the object, wherein the texture mapping network maps a 3D point to a 2D texture space and the inverse texture mapping network maps the 2D texture space back to the 3D point;

obtaining a texture map corresponding to the appearance of the object; and editing the texture map based on the request.

16. The system of claim 15, wherein the operation of receiving a request to edit an appearance of an object, further comprises:

receiving a request to edit the texture map corresponding to the appearance of the object.

17. The system of claim 15, wherein the operation of editing the texture map based on the request, further comprises:

modifying the texture map based on the request to create a modified texture map.

18. The system of claim 17, wherein the operation of modifying the texture map based on the request to create a modified texture map includes:

replacing the texture map with a new texture map, wherein the modified texture map is the new texture map.

19. The system of claim 17, wherein the operation of modifying the texture map based on the request to create a modified texture map includes:

combining the texture map with one or more changes included in the request to edit the appearance of the object to create a new texture map.

20. The system of claim 15, wherein the volumetric neural rendering system generates a 3D geometric representation of the object and separately generates a 3D appearance representation of the object, and wherein to generate the 3D geometric representation of the object and separately generate the 3D appearance representation of the object, the volumetric neural rendering system is configured to:

obtain a plurality of images of a scene depicting the object;

determine a volume density of the scene using a scene geometry network to generate the 3D geometric representation of the object;

map 3D points of the scene to the 2D texture space using the texture mapping network; and determine radiance values for each 2D point in the 2D texture space from a plurality of viewpoints using a texture network to generate the 3D appearance representation of the object.

\* \* \* \* \*